United States Patent
Hart et al.

(10) Patent No.: US 9,748,564 B2
(45) Date of Patent: Aug. 29, 2017

(54) ELECTRODE COMPOSITIONS AND RELATED ENERGY STORAGE DEVICES

(71) Applicant: General Electric Company, Schenectady, NY (US)

(72) Inventors: Richard Louis Hart, Broadalbin, NY (US); Michael Alan Vallance, Albany, NY (US)

(73) Assignee: General Electric Company, Niskayuna, NY (US)

( * ) Notice: Subject to any disclaimer, the term of this patent is extended or adjusted under 35 U.S.C. 154(b) by 42 days.

(21) Appl. No.: 14/550,408

(22) Filed: Nov. 21, 2014

(65) Prior Publication Data
US 2016/0149211 A1    May 26, 2016

(51) Int. Cl.
| | | |
|---|---|---|
| *H01M 10/39* | (2006.01) | |
| *H01M 4/38* | (2006.01) | |
| *H01M 4/58* | (2010.01) | |
| *H01M 4/136* | (2010.01) | |
| *H01M 4/62* | (2006.01) | |

(52) U.S. Cl.
CPC ............ *H01M 4/38* (2013.01); *H01M 4/136* (2013.01); *H01M 4/381* (2013.01); *H01M 4/382* (2013.01); *H01M 4/5815* (2013.01); *H01M 4/62* (2013.01); *H01M 10/399* (2013.01); *H01M 2300/0054* (2013.01); *H01M 2300/0057* (2013.01)

(58) Field of Classification Search
CPC .............................. H01M 10/399; H01M 10/39
See application file for complete search history.

(56) References Cited

U.S. PATENT DOCUMENTS

| | | | |
|---|---|---|---|
| 4,145,806 A | | 3/1979 | Lai |
| H1334 H | * | 7/1994 | Plichta .............. H01M 10/3909 |
| | | | 429/103 |
| 5,476,733 A | * | 12/1995 | Coetzer ................... H01M 4/36 |
| | | | 29/623.1 |
| 6,689,711 B2 | | 2/2004 | Lefebvre |
| 8,076,029 B2 | | 12/2011 | Sliger et al. |
| 8,343,661 B2 | | 1/2013 | Galloway et al. |
| 8,440,342 B2 | | 5/2013 | Swift et al. |

(Continued)

FOREIGN PATENT DOCUMENTS

| | | | |
|---|---|---|---|
| CN | 103515596 A | | 1/2014 |
| DE | 19755351 A1 | | 6/1999 |
| WO | WO 97/32350 | * | 2/1997 |

OTHER PUBLICATIONS

Allan J. Jacobson et al., New Iron Sulfur Cathodes for Nonaqueous Lithium Batteries, Journal of Electrochemical Society, ECS, Jun. 1979, vol. 126, Issue 6, pp. 887-891.

(Continued)

*Primary Examiner* — Olatunji Godo
(74) *Attorney, Agent, or Firm* — Jason K. Klindtworth

(57) ABSTRACT

A positive electrode composition is presented. The composition includes granules that comprise an electroactive metal, an alkali metal halide, and a metal sulfide composition that is substantially-free of oxygen. A molar ratio of the electroactive metal to an amount of sulfur in the metal sulfide composition is between about 1.5:1 and about 50:1. The positive electrode composition is substantially free of iron oxide, iron sulfate, cobalt oxide and cobalt sulfate. An energy storage device and a related energy storage system are also described.

15 Claims, 4 Drawing Sheets

(56) References Cited

U.S. PATENT DOCUMENTS

| | | |
|---|---|---|
| 2010/0086834 A1 | 4/2010 | Mahalingam et al. |
| 2013/0196209 A1 | 8/2013 | Hart et al. |
| 2014/0030596 A1 | 1/2014 | Wu et al. |
| 2014/0178791 A1 | 6/2014 | Vallance et al. |

OTHER PUBLICATIONS

Cheng et al., Metal—air batteries: from oxygen reduction electrochemistry to cathode catalysts, The home of high impact reviews from across the chemical sciences, Chemical Society Reviews, 2012, Issue 6, 22 pages.

* cited by examiner

ELECTRODE COMPOSITIONS AND RELATED ENERGY STORAGE DEVICES

BACKGROUND

The present disclosure generally relates to electrode compositions. More specifically, the present disclosure relates to compositions for use as positive electrode materials in energy storage devices. The disclosure also includes energy storage devices that utilize such electrode compositions.

Metal halide batteries are widely employed for energy storage applications. In particular, metal chloride batteries including a molten sodium negative electrode (anode) and a beta-alumina solid electrolyte, are of considerable interest for use in industrial vehicles, telecommunication, utility applications, and uninterruptible power supply (UPS) devices. In addition to the anode, the batteries include a positive electrode (cathode) that supplies/receives electrons during the charge/discharge of the battery. The positive electrode of such batteries is usually built from nickel metal, sodium chloride (NaCl) and a molten-salt electrolyte such as sodium tetrachloroaluminate $NaAlCl_4$.

Current development of the sodium-metal chloride batteries is focused on the improvement of the performance and the cycle life. When these metal halide batteries are employed in mobile and utility applications, such as hybrid locomotives or plug-in electric vehicles (PHEV), the battery should tolerate power surges (high currents) during both charging and discharging, without a loss in the capacity and the cycle life. Generally, when these batteries are discharging using high discharge current rates (e.g., at 110 W/cell for a 110 W-h cell), multiple discharge cycles may be conducted with no significant increase in the resistance, increase in the charging time, or loss of the capacity. However, when discharging at low discharge currents, the sodium metal halide batteries may degrade very rapidly, leading to low charging rate (i.e. the charging time may increase).

A common way to improve the performance of these batteries is an addition of a small amount of various additives to the positive electrode composition. The use of sodium salts of other halogens (NaF, NaBr and NaI), and/or elemental sulfur as additives has been tried. Addition of iron monosulfide (FeS) instead of elemental sulfur allowed for better sulfur distribution in the electrode material and less variability. High amounts of sulfur in the positive electrode (U.S. Pub. No. 20140178791A1) have shown an improvement in the charging rate and a reduction in the degradation rate. These attributes improve the performance of a battery, as compared to one having a small or negligible amount of sulfur in the positive electrode.

There continues to be a growing need for additional improvements in the performance and the cycle life of the batteries. It may be desirable to have an electrode material that maintains or improves the performance of a sodium-metal chloride battery.

BRIEF DESCRIPTION

One embodiment of the invention is directed to a positive electrode composition. The composition includes granules that themselves include an electroactive metal, an alkali metal halide, and a metal sulfide composition that is substantially free of oxygen. A molar ratio of the electroactive metal to the amount of sulfur in the metal sulfide composition is between about 1.5:1 and about 50:1. The positive electrode composition is substantially free of iron oxide, iron sulfate, cobalt oxide, and cobalt sulfate.

Another embodiment is directed to an energy storage device. The device includes a first compartment including an alkali metal, a second compartment including a positive electrode composition, and a solid separator capable of transporting alkali metal ions between the first compartment and the second compartment. The positive electrode composition includes:
(a) an electrolyte comprising a complex metal halide; and
(b) granules that themselves comprise:
  (i) an electroactive metal,
  (ii) an alkali metal halide, and
  (iii) a metal sulfide composition that is substantially free of oxygen, wherein a molar ratio of the electroactive element to the amount of sulfur in the metal sulfide composition is between about 1.5:1 and about 50:1; and
wherein the positive electrode composition is substantially free of iron oxide, iron sulfate, cobalt oxide, cobalt sulfate or combinations thereof.

An energy storage system including a plurality of the energy storage devices is also provided in one embodiment.

DETAILED DESCRIPTION

Figure 1:
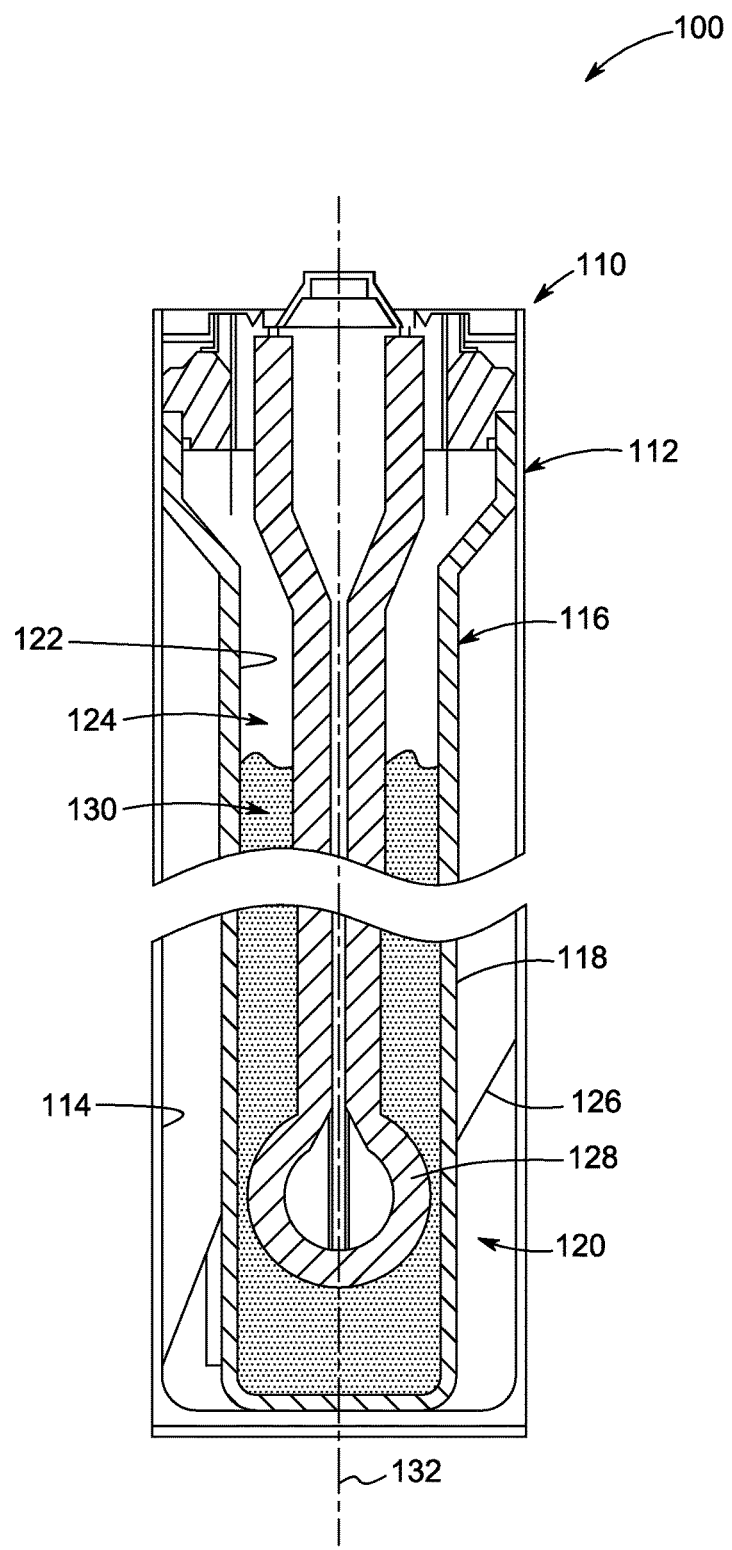
FIG. 1 is a schematic, cross-sectional view of a portion of an energy storage device, in accordance with some embodiments of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As used herein, "positive electrode composition" (or "cathode material", "cathode composition", "positive electrode material" or "cathodic material), which may all be used interchangeably) is the material that supplies electrons during charge and is present as part of a redox process.

"Negative electrode composition" (or "anode material", "anodic material" or "negative electrode material") accepts electrons during charge and is present as part of the redox process.

An electrolyte or electrolyte salt is a medium that provides the ion transport mechanism between the positive and the negative electrodes of a device/cell, and may act as a solvent for the oxidized form of the positive electrode material. Additives that facilitate a primary redox process, but do not themselves provide the primary redox process, are distinguished from the electrolyte itself.

As discussed in detail below, some embodiments of the invention provide a positive electrode composition including granules that comprise an electroactive metal, an alkali metal halide, and a sulfide composition. A molar ratio of the electroactive metal to an amount of sulfur in the sulfide composition is between about 1.5:1 and about 50:1. The sulfide composition is substantially free of oxygen.

As used herein, the term "granules" of the positive electrode composition includes most of the constituents of the positive electrode composition, except an electrolyte salt (discussed below). "Granules", refers to particles of a variety of shapes, sizes and geometries. Granules may be in the state of coarse particles or a powder. In one embodiment, the particle may have a shape that is a sphere, a cube, a plate, a flake or a whisker. In some embodiments, a cross sectional geometry of the particles in the granules may be one or more of circular, ellipsoidal, triangular, rectangular, or polygonal. In some embodiments, the particles may be irregular in shape. The granules may include particles having one or more of the aforementioned shapes and/or geometries.

The electroactive metal, as used herein, is a metal that oxidizes in molten sodium tetrachloroaluminate, resulting in a metal halide salt above the oxidation potential of aluminum (about 1.58 V vs. Na/Na ion), and below the oxidation potential of chloride (about 4.15 V vs. Na/Na ion). In some embodiments, the granules of the positive electrode composition (or the positive electrode granules) include an electroactive metal selected from the group consisting of nickel, iron and cobalt. Additional suitable examples of the electroactive metals may include titanium, vanadium, niobium, molybdenum, chromium, manganese, silver, antimony, cadmium, tin, lead, copper and zinc. Combinations of any of these metals are also possible. Usually, the metals are obtained as powders from various commercial sources.

In some specific embodiments, the positive electrode granules include nickel. Very often, nickel is the most preferred electroactive metal, in view of various attributes, including cost, availability, the high reduction potential ("redox potential") of nickel relative to sodium/sodium ion (Na/Na ion); and the low solubility of the nickel cations in the positive electrode composition. Nickel usually serves as the electronic conduction grid (i.e., a conductive structure or network) in the electrode. In some embodiments, the positive electrode granules include at least two electroactive metals. For example, the granules may include nickel and iron.

Generally, the electroactive metal is present in an elemental form during the preparation of the granules or the construction of a positive electrode. In some embodiments, the electroactive metal may optionally include a salt form of the electroactive metal. In one embodiment, the electroactive metal salt may be in the form of a nitrate, sulfide, or halide of the electroactive metal. The halide salts are preferred in some instances.

The alkali metal halide is typically present in the positive electrode composition to promote the desired electrochemical reaction for an electrochemical cell or an energy storage device of interest. The alkali metal halide may include a halide selected from chloride, bromide, fluoride and iodide. In some embodiments, the halides of sodium, potassium, or lithium are used. In some embodiments, the positive electrode composition includes at least one halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride and cesium chloride. In some specific embodiments, the composition includes sodium chloride.

The positive electrode composition may further include some additives that beneficially affect the performance of the energy storage device/cell. Such performance additives may increase the ionic conductivity, increase or decrease the solubility of the charged cathode species, improve the wetting of the solid separator by the molten electrolyte; or prevent the ripening of the positive electrode material. In some embodiments, an additive may be present in an amount less than about 5 weight percent (e.g., with a minimum level of about 0.1 weight percent), based on a total weight of the alkali metal halide in the positive electrode composition. Examples of such additives include one or more additional metal halides, e.g., sodium iodide, sodium fluoride and sodium bromide. In some specific embodiments, sodium iodide, when present, is at a level of about 0.1 weight percent to about 0.9 weight percent, based on the total weight of the alkali metal halides present in the positive electrode composition. In some embodiments, sodium fluoride is present at a level of about 0.1 weight percent to about 3 weight percent, based on the total weight of the alkali metal halide present in the positive electrode composition. Some specific positive electrode compositions are described in copending application Ser. No. 13/034,184 (D. Bogdan et al); filed on Feb. 24, 2011, and is incorporated herein by reference.

As noted, the granules of the positive electrode composition further include an amount of sulfur. Sulfur may be present in the form of molecular sulfur or a sulfur-containing compound, such as a metal sulfide. In some embodiments, an amount of sulfur is incorporated into the positive electrode composition during the step of the formation of the granules. Usually, sulfur is uniformly dispersed within the positive electrode composition.

In some specific embodiments, the positive electrode granules include a metal sulfide composition of formula $M_xS_y$, where M is selected from iron or cobalt; and a ratio of x to y is between about 0.5:1 and about 1.5:1. In some embodiments, M is iron. In other embodiments, M is cobalt. Non-limiting examples of the metal sulfides $M_xS_y$ include FeS (troilite), $FeS_2$ (pyrite), pyrrhotite, $CoS_2$, $Co_3S_4$, and $Co_9S_8$. In certain embodiments, the metal sulfide is FeS. A skilled person will understand that x and y are not necessarily integers.

In these embodiments, cobalt is not meant to be utilized as both the electroactive metal and M. That is, if the electroactive metal includes cobalt, M is iron. If M is cobalt, the electroactive metal exclusively includes nickel or iron. If the electroactive metal does not include cobalt, M may be selected from cobalt or iron. Similarly, if M is iron, the electroactive metal may include cobalt. In some embodiments in which the electroactive metal is nickel, there may be present more than one metal sulfide $M_xS_y$ in the positive electrode composition; for example, the metal sulfide may include both FeS and CoS. Similarly, when M is iron, there may be present more than one electroactive metal, that is the granules may include both nickel and cobalt.

A molar ratio of the electroactive metal to the sulfur (e.g., present in the metal-containing compound) in the positive electrode granules may range from about 1.5:1 to about 50:1. In some embodiments, the molar ratio of the electroactive metal to the sulfur is between about 2:1 and about 25:1. In some embodiments, the sulfur is present in a relatively high amount in the positive electrode composition as described in U.S. Publication No. 2014017879A1. The high amount of the sulfur in the positive electrode composition attributes to the fast charging, and thus improves the charging performance of the cell/device. In some embodiments, the molar ratio of the electroactive metal to the sulfur is between about 2:1 and about 10:1, and more particularly, between about 5:1 and about 10:1. To be perfectly clear, when a range of the molar ratio, for example "between about 5:1 and about 10:1" is used, it is meant to include all values, including non-integer values, that fall between and including 5:1 and 10:1, for instance, 5:1, 6:1, 6.2:1, 7.5:1, 8.75:1, etc.

In some embodiments, a molar ratio of a total amount of an alkali metal in the alkali metal halide to the sulfur present in the electrode composition ranges from about 1.5:1 to about 50:1. In some embodiments, the molar ratio of the total amount of alkali metal in the alkali metal halide to the sulfur is between about 1.75:1 and about 10:1. In some embodiments, the molar ratio of the total amount of alkali metal in the alkali metal halide to the sulfur is between about 1.75:1 and about 5:1. In some embodiments, the molar ratio of the total amount of alkali metal in the alkali metal halide to the sulfur is between about 1.75:1 and about 2.5:1. As above, to be perfectly clear, when the term "between 1.75:1 and 10:1" is used, it is meant to include all values, including non-integer values, that fall between and including 1.75:1 and 10:1, for instance, 2:1, 2.1:1, 3.25:1, 7.5:1, 8.75:1, etc.

In one embodiment, the positive electrode composition is substantially free of a transition metal compound. The transition metal compounds may be oxides or sulfates, for example iron oxide, cobalt oxide, iron sulfate and cobalt sulfate. In some embodiments, the positive electrode composition is substantially free of iron oxide, iron sulfate, cobalt oxide and cobalt sulfate. The presence of a small amount (e.g., less than 0.5 weight percent) of these transition metal compounds (e.g., $Fe_3O_4$) in the positive electrode composition may not have a significant effect on the performance of the device. However, a considerable amount (e.g., greater than about 1.0 weight percent) of the transition metal compounds may degrade the performance, and result in a low efficiency of the resulting device. As used herein, the term "substantially free of a transition metal compound" means that the positive electrode composition may include no or a small amount of the transition metal compounds. In some embodiments, the positive electrode composition may include less than about 1.0 weight percent, and in particular embodiments, less than about 0.75 weight percent of the transition metal compounds, based on the total weight of the granules. In some embodiments, the transition metal compounds may be present in a range from about 0.01 weight percent to about 0.75 weight percent, based on the total weight of the granules.

As noted, it may be desirable that the transition metal compounds (as described above) are not present in the positive electrode composition. However, the transition metal compounds, e.g., iron oxide and iron sulfate, are often present as impurities in a starting material (constituent) for forming the granules, for example iron sulfide. Commercially available iron sulfides usually include small amounts of one or more iron oxides, e.g., wustite (FeO), magnetite ($Fe_3O_4$), hematite ($Fe_3O_4$) or iron sulfate ($FeSO_4$). Other metal sulfides, e.g., $CoS_2$ may contain $CoO_2$, $CO_3O_4$, $CoSO_4$ or a combination thereof.

Figure 3:
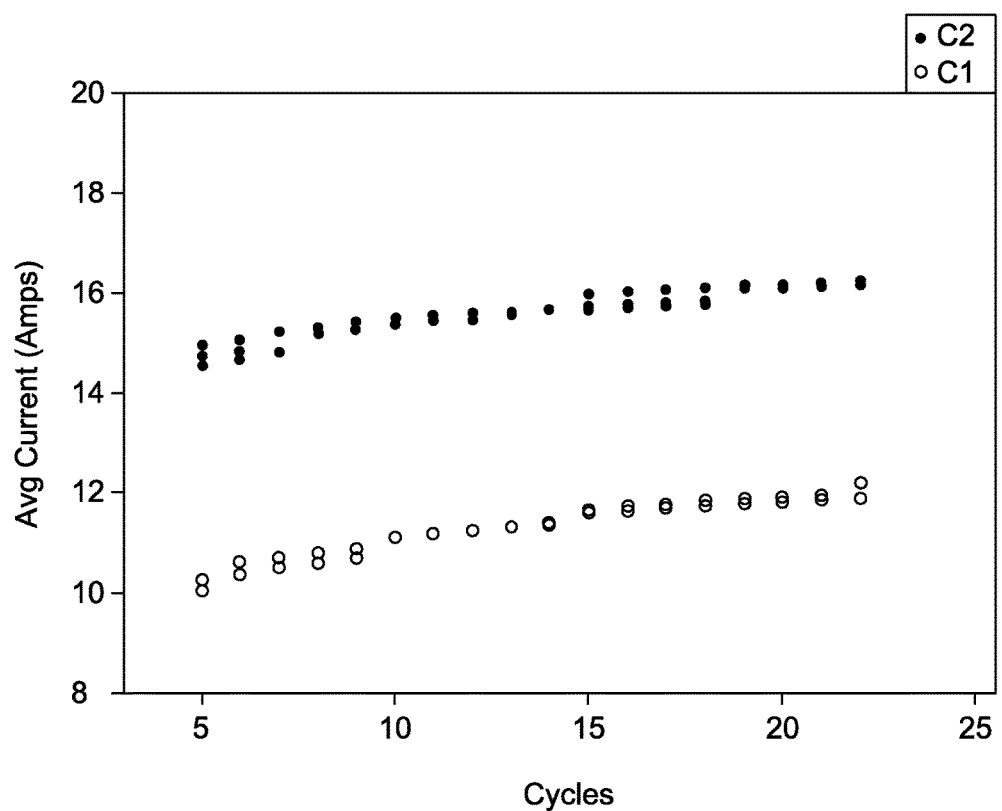
FIG. 3 shows a graph comparing charge times of a comparative energy storage device and an experimental energy storage device, in accordance with some embodiments of the invention.

Without being bound by any theory, it is believed that the transition metal compounds, as described herein, for example $Fe_3O_4$, may provide an oxygen content in the electrode composition that may adversely affect the performance of the cell. An amount of the oxygen present in the commercially available metal sulfide compositions (due to the presence of the transition metal oxides and sulfates) may generally vary from about 0.1 weight percent to about 15 weight percent. FIG. 3 shows variations in the performance of the cells constructed by using the metal sulfide compositions procured from two different sources.

According to some embodiments of the present invention, the metal sulfide composition is substantially free of oxygen. That is, the metal sulfide composition includes no or a small amount of oxygen. In some embodiments, a metal sulfide composition containing no impurity of the transition metal compounds is desirable. It has been observed by the inventors that an amount of less than about 1.0 weight percent oxygen (based on the total weight of the metal sulfide composition), present in the electrode composition due to the presence of the transition metal compounds (i.e., oxides and sulfates impurities) may be acceptable to maintain a good performance of a device. In some embodiments, an amount of the oxygen should be less than or equal to about 0.2 weight percent, based on the total weight of the granules. In some embodiments, the amount of the oxygen content from the transition metal oxides and sulfates ranges from about 0.01 weight percent to about 0.2 weight percent.

As discussed, the positive electrode composition, according to some embodiments of the invention, includes no or a little amount of the transition metal compounds to avoid/prevent degradation in the performance of the cell/device. In some other embodiments, a metal sulfide containing a high amount of a transition metal compound or a high amount of oxygen (e.g., >1 weight percent of oxygen content, based on the total amount of metal sulfide composition) may be first treated to remove/reduce the oxygen content in the metal sulfide to be used for the formation of the positive electrode granules. Such metal sulfide can be treated chemically or physically, by using any known technique in the art, e.g., treating the metal sulfide with hydrogen sulfide. Other methods may include using a sulfur-containing species in a liquid state, such as a sulfur-containing melt or a reactive organic-sulfur agent.

As known to those skilled in the art, the positive electrode composition may additionally include small amounts of some metal oxides other than the transition metal oxides, such as alumina, silica or combinations thereof, e.g., alumino-silicates. Small quantities of alumino-silicates may often be present in the alkali metal halide to prevent clumping of the salt during the electrochemical reactions of the cell. It has been observed that the presence of these oxides does not affect the performance of cell. These oxides have good stability, and thus remain inert i.e., do not react chemically or electrochemically with any species in the positive electrode composition throughout the operation of the cell.

Often, the electroactive metal and the alkali metal halide may be present in the form of granules in the positive electrode composition. In some embodiments, an amount of a metal sulfide (that may contain a low amount of transition metal compounds, as discussed in the above embodiments) is incorporated into the positive electrode composition during the step of the formation of the granules. Usually, the amount of sulfur is uniformly dispersed within the positive electrode composition.

In some embodiments, the positive electrode composition further includes an electrolyte salt. In some embodiments, the positive electrode granules are infused with a molten-salt electrolyte. In some embodiments, the molten-salt electrolyte enables the transportation of the alkali ions from a solid separator (described later) to the positive electrode, and vice-versa. In one embodiment, the molten-salt electrolyte includes a complex halide including an alkali metal halide and an aluminum halide. In a specific embodiment, the molten-salt electrolyte is sodium tetrachloroaluminate ($NaAlCl_4$). In some embodiments, the molten electrolyte may include at least one additional metal halide, and forms a ternary or quaternary electrolyte.

In addition to the components discussed above, the positive electrode composition may include a number of other constituents, in some embodiments. As an example, aluminum may be included in the positive electrode composition in a form other than its form in the electrolyte salt, and other than as aluminum halide. In some embodiments, the aluminum may be added in the elemental form, e.g., aluminum metal flakes or particles. In some embodiments, the amount of elemental aluminum present in the positive electrode composition may be in a range from about 0.1 weight percent to about 1.5 weight percent, based on the total weight of the positive electrode granules.

In some embodiments, the positive electrode composition may further include carbon. Carbon may be present in the form of carbon black or graphite. If present, the amount of carbon is usually in the range of from about 0.1 weight percent to about 5 weight percent, based on a total weight of the positive electrode granules.

In some embodiments, the electroactive metal includes nickel; the alkali metal halide includes at least one of sodium chloride, sodium fluoride, and sodium iodide; and the metal sulfide includes iron sulfide having not more than about 1.0 weight percent of iron oxide.

Another embodiment of the invention is directed to an energy storage device/electrochemical cell. Referring to FIG. 1, an energy storage device 100 is presented. More particularly, a cross-sectional view 110 of the device is depicted. The device 100 includes a housing 112. The housing 112 of the device or cell 100 may be sized and shaped to have a cross-sectional profile that is square, polygonal, or circular, for example. The housing may be formed from a material including a metal, ceramic, a composite; or combinations thereof. In some embodiments, a suitable metal may include nickel, iron, molybdenum, or an alloy thereof, e.g. steel.

The housing 112 usually has an interior surface 114, defining a volume. A separator 116 is disposed inside the housing 112. The separator 116 has a first surface 118 that defines a first compartment 120 (for example, an anode compartment); and a second surface 122 that defines a second compartment 124 (for example, a cathode compartment or a positive electrode compartment). The first compartment 120 is in ionic communication with the second compartment 124 through the separator 116. As used herein, the phrase "ionic communication" refers to the traversal of ions between the first compartment 120 and the second compartment 124, through the separator 116. In some embodiments, the separator is capable of transporting alkali metal ions between the first and the second compartments. Suitable alkali metal ions may include cationic forms of one or more of sodium, lithium and potassium. In specific embodiments, the alkali metal ions include sodium.

Figure 2:
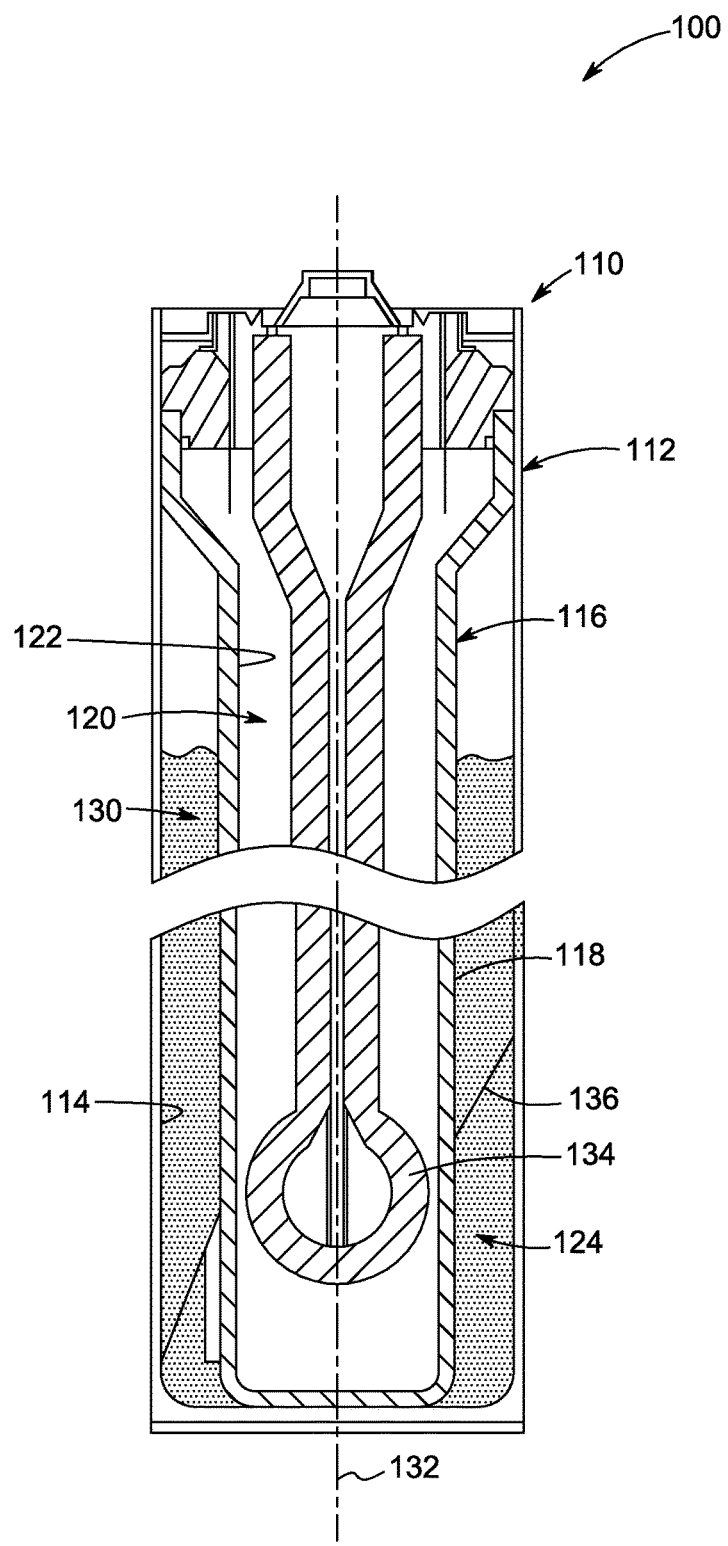
FIG. 2 is a schematic, cross-sectional view of a portion of an energy storage device, in accordance with some embodiments of the invention.

FIG. 1 depicts embodiments wherein the second compartment 124 is disposed within the first compartment 120. In such instances, the positive electrode compartment 124 is disposed within the anode compartment 120. In some other embodiments, the first compartment 120 may be disposed in the second compartment 124, as indicated in FIG. 2. In such instances, the anode compartment 120 is disposed within the positive electrode compartment 124.

In one embodiment, the first compartment or the anode compartment 120 contains an anodic material (not shown); and the second compartment or the positive electrode compartment 124 contains a positive electrode composition or a cathode material 130. Typically, the anode compartment 120 is empty in the ground state (uncharged state) of the cell 100. The anode compartment 120 is then filled with a metal from the reduced alkali metal ions that move from the positive electrode compartment 124 to the anode compartment 120 through the separator 116, during operation of the cell 100. The anode compartment 120 may receive and store a reservoir of the anodic material, in some embodiments. Typically, the anodic material includes an alkali metal. Non-limiting examples of the anodic material may include lithium, sodium, or potassium. The anodic material is usually molten during use. In one embodiment, the anodic material is molten sodium.

In some embodiments, the anodic material may include one or more additives. Additives suitable for use in the anodic material may include a metallic oxygen scavenger. Suitable metal oxygen scavengers may include one or more of manganese, vanadium, zirconium, aluminum, or titanium. Other useful additives may include materials that increase wetting of the separator surface defining the anode compartment, by the molten anodic material. Additionally, some additives or coatings may enhance the contact or wetting between the separator and the current collector, to ensure substantially uniform current flow throughout the separator.

Further, as noted earlier, a positive electrode composition (or cathodic material) 130 is usually disposed inside the second compartment (positive electrode compartment) 124. In some embodiments, the positive electrode composition 130 includes granules comprising an electroactive metal, an alkali metal halide, sulfur and carbon, and an electrolyte salt. Details of the positive electrode composition are described previously.

The positive electrode composition 130 may be self-supporting or may be liquid/molten, in some embodiments. In one embodiment, the positive electrode composition 130 is disposed on an electronically conductive support structure. The support structure, itself may not undergo any chemical reaction during the charge/discharge, and may simply support the positive electrode material during the chemical reactions. The support structure may be present in a number of forms, such as a foam, a mesh, a weave, a felt, or a plurality of packed particles, fibers, or whiskers. In one embodiment, a suitable support structure may be formed from carbon or a metal.

With continued reference to FIGS. 1 and 2, in some embodiments, the energy storage device 100 may include a plurality of current collectors, including a negative current collector 126/134 (also referred to as the anode current collector), and a positive electrode current collector 128/136 (also referred to as the cathode current collector). The anode current collector 126/134 is in electrical communication with the anode compartment 120; and the cathode current collector 128/136 is in electrical communication with the contents of the positive electrode compartment 124. In some embodiments, the anode current collector may function as a shim, as well. Suitable materials for the anode current collector include iron, aluminum, tungsten, titanium, nickel, copper, molybdenum, carbon and combinations thereof. The positive electrode current collector may be in various forms, for example, rod, sheet, wire, paddle, or mesh. Suitable materials for the positive electrode current collector include platinum, palladium, gold, nickel, copper, carbon, tungsten, molybdenum and combinations thereof. The current collector may be plated or clad.

As noted above, a separator 116 (FIGS. 1 and 2) is disposed within the volume of the housing 112. In some embodiments, the separator 116 is a solid separator. In some embodiments, the solid separator is an alkali metal ion conductor solid electrolyte capable of transporting alkali metal ions between the first compartment 120 and the second compartment 124. Suitable materials for the solid separator may include an alkali-metal-beta-alumina, alkali-metal-beta"-alumina, alkali-metal-beta'-gallate, or alkali-metal-beta"-gallate. In some embodiments, the solid separator may include a beta-alumina, a beta"-alumina, a gamma alumina, or a micromolecular sieve such as, for example, a tectosilicate, such as a feldspar, or a feldspathoid. Other exemplary separator materials include zeolites, for example a synthetic zeolite such as zeolite 3A, 4A, 13X, ZSM-5; rare-earth silicophosphates; silicon nitride; or a silicophosphate (NASICON: $Na_3Zr_2Si_2PO_{12}$).

In some embodiments, the separator may be stabilized by the addition of small amounts of a dopant. The dopant may include one or more oxides selected from lithia, magnesia, zinc oxide, and yttria. These stabilizers may be used alone or in combination with themselves, or with other materials.

In particular embodiments, the separator includes a beta alumina. In one embodiment, a portion of the separator is alpha alumina, and another portion of the separator is beta alumina. In some embodiments, the alpha alumina (a non-ionic-conductor) may help with the sealing and/or fabrication of the cell. In a particular embodiment, the separator is formed of a beta alumina separator electrolyte (BASE), and may include one or more dopants.

As described for some embodiments, at least one of the alkali metals in the positive electrode composition may be sodium, and the separator may be beta-alumina. In another embodiment, the alkali metal may be potassium or lithium, with the separator then being selected to be compatible therewith. For example, in embodiments where the ions include potassium, silver, strontium, and barium cations, the separator material may include beta alumina. In certain other embodiments, where lithium cations are used, lithiated borophosphate $BPO_4$—$Li_2O$, may be employed as the separator material.

In some embodiments, the separator may be sized and shaped to provide a maximum surface area for the alkali metal ion transport. In one embodiment, the separator may be a tubular container having at least one wall of a selected thickness; and a selected ionic conductivity. In some embodiments, the thickness of the separator wall may be less than about 5 millimeters. A cation facilitator material may be disposed on at least one surface of the separator, in one embodiment. The cation facilitator material may include, for example, selenium, as discussed in published U.S. Patent Publication No. 2010/0086834, incorporated herein by reference.

In some embodiments, the tubular separator 116 may have a cross-sectional profile normal to a vertical axis 132 of the housing 112 (FIGS. 1 and 2). Examples of profiles/shapes include a circle, a triangle, a square, a cross, a cloverleaf, or a star. In one embodiment, the separator 116 may have a length (along the vertical axis 132) to width ratio that is greater than about 1:10. In one embodiment, the length to width ratio of the separator is in a range of from about 1:10 to about 1:5.

Alternatively, the cross-sectional profile of the separator may be planar about the vertical axis 132. A planar configuration (or one with a slight dome) may be useful in a prismatic or button-type battery configuration, where the separator is domed or dimpled. Similarly, the separator may be flat or undulated. In one embodiment, the solid separator may include a shape which may be flat, undulated, domed or dimpled, or includes a shape with a cross-sectional profile that may be an ellipse, triangle, cross, star, circle, cloverleaf, rectangular, square, or multi-lobal.

In some embodiments, one or more shim structures may be disposed within the volume of the housing. The shim structures may support the separator within the volume of the housing. The shim structures may protect the separator from vibrations caused by the motion of the cell during use, and thus reduce or eliminate the movement of the separator relative to the housing. In one embodiment, a shim structure may also function as a current collector, as described herein.

In some instances, the operating temperature of the device/cell may be in a range from about 270 degrees Celsius to about 350 degrees Celsius.

The energy storage device/electrochemical cell is usually assembled in the discharged state. Applying a voltage between the anode and the cathode of the cell can charge the cell. In some embodiments, the sodium chloride in the positive electrode material (or the cathode material) dissolves into the electrolyte to form the sodium ions and the chloride ions. The sodium ions, under the influence of an applied electrical potential, conduct through the separator and combine with the electrons from the external circuit to form the sodium electrode (i.e., the anode), and the chloride ions react with the cathode material to form a metal chloride and donate electrons back to the external circuit. During discharge, the sodium metal that is often present in the molten form in the anode, donates electrons to the load and the sodium ions conduct back through the separator, reversing the reaction. The cell reactions are as follows (charging is to the right):

At positive electrode: $nNaCl + M \leftrightarrow MCl_n + nNa^+ + ne^-$
At negative electrode: $nNa^+ + ne^- \leftrightarrow nNa$
Overall: $nNaCl + M \leftrightarrow MCl_n + nNa$ Furthermore, the embodiments described herein allow for operation of a cell that utilizes the cathode more cost-effectively. Typically, the cathode of a conventional cell often contains a considerable amount of nickel. Nickel (II) chloride is not an electronic conductor, so additional nickel is included in the as-built conventional cell to account for the loss of conductivity upon nickel oxidation. In other words, the entire amount of nickel that is typically used may not be required for the operation of the cell, but a portion of nickel may be required to maintain a packing density and create a conductive structure. Embodiments of this disclosure, however, contain reduced amounts of nickel, often less than about 80 percent of conventional cells, along with an amount of carbon e.g., at least 5 grams of carbon (e.g., carbon black); and an amount of a sulfur composition e.g., at least 50 grams of troilite (FeS). As known to those skilled in the art, carbon is an electronic conductor. In addition, a significant fraction of nickel, in some embodiments, is oxidized to heazlewoodite ($Ni_3S_2$) during charging, which is an electronic conductor. Thus, both carbon and sulfur contribute to form or maintain the conductive structure in the electrode.

Another embodiment of the invention is directed to an energy storage system or battery. In some embodiments, a plurality of the energy storage devices or electrochemical cells (each of which may be considered a rechargeable energy storage device), as described herein, may be organized into an energy storage system, for example, a battery. Multiple cells may be connected in series or parallel, or in a combination of series and parallel. For convenience, a group of coupled cells may be referred to as a module or pack. The ratings for the power and energy of the module may depend on such factors as the number of cells, and the connection topology in the module. Other factors may be based on end-use application specific criteria.

In some embodiments, the energy storage devices illustrated herein may be rechargeable over a plurality of charge-discharge cycles. In general, the energy storage device may be employed in a variety of applications; and the plurality of cycles for recharge may be dependent on factors such as charge and discharge currents, a depth of discharge, cell voltage limits, and the like.

In one embodiment, the energy storage system is in the form of an uninterruptable power supply (UPS) device. The primary role of most UPS devices is to provide short-term power (backup power) when the input power source fails. However, most UPS units are also capable in varying degrees of correcting common utility power problems, such as those described in patent application Ser. No. 13/034,184. UPS systems including batteries having electrode compositions as described above may be ideal in those situations, where high energy density within the battery is a requirement. In one embodiment, the energy storage system is in the form of a battery backup system for a telecommunication ("telecom") device, sometimes referred to as a telecommunication battery backup system (TBS).

The energy storage system described herein can usually store an amount of energy that is in a range of from about 0.1 kiloWatt hour (kWh) to about 100 kWh. An illustration can be provided for the case of a sodium-nickel chloride energy storage system (i.e., a battery) with a molten sodium anode and a beta-alumina solid electrolyte, operating within the temperature range noted above. In that instance, the energy storage system has an energy-by-weight ratio of greater than about 100 Watt-Hours per kilogram, and/or an energy-by-volume ratio of greater than about 200 Watt-Hours per liter. Another embodiment of the energy storage system has a specific power rating of greater than about 200 Watts per kilogram; and/or an energy-by-volume ratio of greater than about 500 Watt-Hours per liter. Suitable energy storage systems may have an application specific Power to Energy ratio of less than 10 to 1 hour$^{-1}$. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

It should be noted that the energy term here is defined as the product of the discharge capacity multiplied by the thermodynamic potential. The power term is defined as the power available on a constant basis, for 15 minutes of discharge, without passing through a voltage threshold sufficiently low to reduce the molten electrolyte.

Other features associated with the energy storage system may constitute embodiments of this disclosure; and some are described in the referenced application Ser. No. 13/034,184. As an example, the system can include a heat management device to maintain the temperature within specified parameters. The heat management device can warm the energy storage system if too cold, and can cool the energy storage system if too hot, to prevent an accelerated cell degradation.

Some other embodiments are directed to an energy management system that includes a second energy storage device that differs from the first energy storage device. This dual energy storage device system can address the ratio of power to energy, in that a first energy storage device can be optimized for efficient energy storage; and the second energy storage device can be optimized for power delivery. The control system can draw from either energy storage device as needed, and charge back either energy storage device that needs such a charge.

Some of the suitable second energy storage devices for the power platform, include a primary battery, a secondary battery, a fuel cell, and/or an ultracapacitor. A suitable secondary battery may be a lithium battery, lithium ion battery, lithium polymer battery, or a nickel metal hydride battery.

EXAMPLES

The examples presented below are intended to be merely illustrative and should not be construed to be any sort of limitation on the scope of the claimed invention. Unless specified otherwise, all of the components are commercially available from common chemical suppliers.

All nickel/sodium chloride based energy devices/cell were assembled, using the following materials:

TABLE 1

| Material | Source | Properties |
|---|---|---|
| Nickel 255 (metal nickel) | Inco Special products | 97.9% pure, 0.6 m$^2$/g surface area, 2.2 to |
| Sodium Chloride (NaCl) | Custom Powders Ltd, UK | 99.99 percent pure |
| Sodium Fluoride (NaF) | Sigma Aldrich | ~99 percent pure |
| Aluminum powder (Al) | Alfa Aesar Item #42919 | −100 + 325 mesh particle size, 99.97% pure |
| Iron (metal iron powder) | Alfa Aesar Item #00170, | less than 10 μm particle size, 99.9% pure |
| Sodium iodide (NaI) | Sigma Aldrich | ~99 percent pure |
| Iron sulfide (FeS) | Alfa Aesar Item #14024 | 99.9 percent pure |

Preparation of Positive Electrode Composition

The sodium chloride (NaCl) had a particle size distribution with 90% by mass less than about 75 micrometers, by sieve analysis. The sodium chloride was heat treated in an oven at 220° C., before use. Positive electrode materials, including metal nickel powder, sodium chloride, sodium fluoride, sodium iodide, iron, and aluminum powder (as per Table 2), were pressed at ambient room temperature (typically about 18° C.-25° C.), under a linear pressure of about 16-25 kN/cm, using an Alexanderwerk WP50N/75 Roll Compactor/Milling Machine. The resulting agglomerate was ground with a classifier mill into granules; and the fraction containing a particle size of about 0.325 to about 1.5 millimeters was used for the cell assembly.

Preparation of Electrochemical Cell

The electrochemical cell used commercial hardware (GE Energy Storage Technology ML/3, Revision 2). A closed-end, β" alumina, separator tube, with cloverleaf cross-section separated the inner positive electrode (cathode)

compartment from the outer anode compartment. The outer wall of the anode was a carbon steel can, with a square profile. The can size was about 38 mm×38 mm×230 mm. The steel can was the current collector for the anode. A central U-shaped nickel rod was the current collector for the cathode. High temperature, hermetic seals were applied to the open top ends of the cathode and the anode. Details of this construction can be found in J. L. Sudworth, J. Power Sources 100 (2001) 149-163.

The positive electrode granules, prepared using the procedure mentioned above, were placed in the cloverleaf shaped β"-alumina tube through a fill hole at the top of the cell assembly, and the granule bed was densified by mechanical vibration. The cathode was then infiltrated with molten sodium tetrachloroaluminate $NaAlCl_4$ through the same fill hole at a temperature of about 280° C.; and the fill hole was then closed with a welded cap. Anhydrous, high-purity sodium tetrachloroaluminate was used as received (Aldrich #451584). Nickel tabs were brazed to the fill-hole cap and the steel can for electrification.

Testing of Cells

All cells were assembled in the discharged state. A standard testing protocol (or cycling protocol) was used.

The protocol was representative of five different duty cycles:
1. Starting at 100 mA and ramping up to 2.75 A over time, charge to 2.67V, then at 2.67V to a current of 500 mA, while at 330° C.
2. Reduce temperature to 300° C. and discharge at −4.5 A to 2.2V.
3. Charge at 10 A to 2.67V, then at 2.67V down to 500 mA.
4. Discharge at −13 W to 2.1V.
5. Charge at 10 A to 2.67V, then at 2.67V down to 500 mA.
6. Discharge at −13 W for 4 hours or to 2.1V.
7. Charge at 20 A to 2.67V, then at 2.67V down to 500 mA.
8. Repeat steps 6 and 7 an additional 9 times.
9. Discharge at −13 W for 6 hours or to 2.1V.
10. Charge at 20 A to 2.67V, then at 2.67V down to 500 mA.
11. Discharge at −14 W to 2.1V.
12. Charge at 10 A to 2.67V, then at 2.67V down to 500 mA.
13. Discharge at −14 W for 28 Ah.
14. Charge at 20 A to 2.67V, then at 2.67V for a total of 13.5 Ah.
15. Discharge at −14 W for 13.5 Ah.
16. Repeat steps 14 and 15 an additional 14 times.
17. Discharge at −14 W for 2 hours or to 2.1V.
18. Charge at 10 A to 2.67V, then at 2.67V down to 500 mA.
19. Discharge at −16.5 W to 2.08V. If Cumulative Ah>425, then go to step 22.
20. Charge at 20 A to 2.67V, then at 2.67V to either current <500 mA or for >4.5 h.
21. Repeat step 19 and 20 until cumulative Ah discharged >425.
22. Charge at 10 A to 2.67V, and then at 2.67V down to 500 mA.
23. Discharge at −4.5 A to voltage <2.2.V, then go to step 18.

Step 1 is the maiden charge, which starts at low current to avoid excessive current densities during the initial production of sodium in the negative electrode. Step 2 is an initial capacity check at 4.5 A. Steps 3 and 4 are a capacity check at 13 W. Steps 6 and 7 are an initial performance measurement on a 13 W, 4 hour TOC (top of charge i.e., full charge) cycle. Step 9 is an extended 13 W discharge to check that the cell can discharge an additional 2 hours after the 4 hour discharge. Step 11 is a capacity check at 14 W. Steps 13 through 15 are an initial performance measurement on a 14 W, PSOC (partial state of discharge) cycle. Step 17 is an extended 14 W discharge to check that the cell can discharge an additional 2 hours after the PSOC discharge. Step 18, is a full charge (TOC) before the deep DOD (depth of discharge) cycling. Steps 19 and 20, repetitively exercise the cell over its entire usable SOC (state of charge) range, with steps 22 and 23 providing information about the low power capacity every 425 Ah.

After running through the above protocol, the cells were placed on a degradation cycling using the following protocol:
1. Discharge at 3.8 A to 1.95V.
2. Charge at 12 A to 2.67V, then CV to 500 mA trip.
3. Discharge at −15 W for 26 Ah or <1.95V.
4. Charge at 12 A to 2.67V, charge to 15.2 Ah or <0.5 A trip.
5. Discharge at −15 W to 15.2 Ah or <1.95V.
6. Repeat steps 4 and 5, 25 times, then go step 2 (TOC reset, followed by SOC discharge to 26.6 Ah). The overall cycle keeps repeating in groups of 25 cycles until user intervention.

Example 1

The positive electrode materials for the two cell groups (C1 and C2) were prepared according to the compositions as provided in Table 2 by using iron sulfide (FeS), respectively, from two different sources FeS 1 and FeS 2. The iron sulfides FeS 1 and FeS 2 contained respectively 13 weight percent and 0.3 weight percent oxygen. These electrode materials were prepared by adding iron sulfide during the premixing, pressing, or grinding steps of the granulation process.

TABLE 2

| Positive electrode Composition | NaCl | Ni255 | NaF | NaI | Fe | Al | FeS |
|---|---|---|---|---|---|---|---|
| Amount (weight percent) | 29.78 | 44.87 | 1.35 | 0.37 | 0.75 | 0.48 | 22.4 |

Electrochemical cells (C1 including FeS 1 and C2 including FeS 2) containing the electrode compositions/materials in Table 2 were constructed and tested by the procedures as described above. These examples had substantially similar components, except for the iron sulfide compound being obtained from two different sources.

FIG. 3 shows variations in the average charging current, with respect to step 4 of the degradation cycle from above, observed in the cells C1 and C2. It is clear from the graph that the cell C1 containing the iron sulfide composition FeS 1 having a higher amount (13 weight percent) of oxygen as compared to that of the cell C2 containing FeS 2 having 0.3 weight percent oxygen, sustains lower average charging current as compared to that of the cell C2.

Example 2

To further study the effect of oxygen content in the electrode composition due to the presence of $Fe_3O_4$, six electrode compositions were prepared as per the compositions given in Table 3 by adding $Fe_3O_4$ during the premixing step of the granulation process. Respectively, electrochemical cells (Ca, Cb, Cc, Cd, Ce, Cf) were constructed and tested by the same method as described above. Table 4 shows the failure data for the six cells. It was observed that the cells with high amounts of oxygen in $Fe_3O_4$ (Ce and Cf) failed due to internal shorting during or prior to the maiden discharge.

TABLE 3

| Cells/Cathode constituents (weight percent) | Ca | Cb | Cc | Cd | Ce | Cf |
| --- | --- | --- | --- | --- | --- | --- |
| NaCl | 29.77 | 29.77 | 29.75 | 29.74 | 29.29 | 29.22 |
| Ni255 | 44.86 | 44.86 | 44.82 | 44.80 | 44.13 | 44.02 |
| Fe | 0.75 | 0.75 | 0.75 | 0.75 | 0.74 | 0.73 |
| Al | 0.48 | 0.48 | 0.48 | 0.48 | 0.47 | 0.47 |
| NaF | 1.35 | 1.35 | 1.35 | 1.35 | 1.33 | 1.33 |
| NaI | 0.37 | 0.37 | 0.37 | 0.37 | 0.36 | 0.36 |
| FeS | 22.10 | 21.77 | 21.18 | 19.92 | 19.79 | 16.21 |
| $Fe_3O_4$ | 0.33 | 0.65 | 1.30 | 2.60 | 3.89 | 7.67 |
| Oxygen content (g/cell) | 0.25 | 0.50 | 1.0 | 2.0 | 3.0 | 6.0 |

TABLE 4

| Cells | Oxygen content in the electrode composition (g/cell) | No. of cells tested | No. of failed cells |
| --- | --- | --- | --- |
| Ca | 0.25 | 2 | 0 |
| Cb | 0.5 | 2 | 0 |
| Cc | 1.0 | 2 | 0 |
| Cd | 2 | 2 | 0 |
| Ce | 3 | 2 | 2 |
| Cf | 6 | 2 | 2 |

Figure 4:
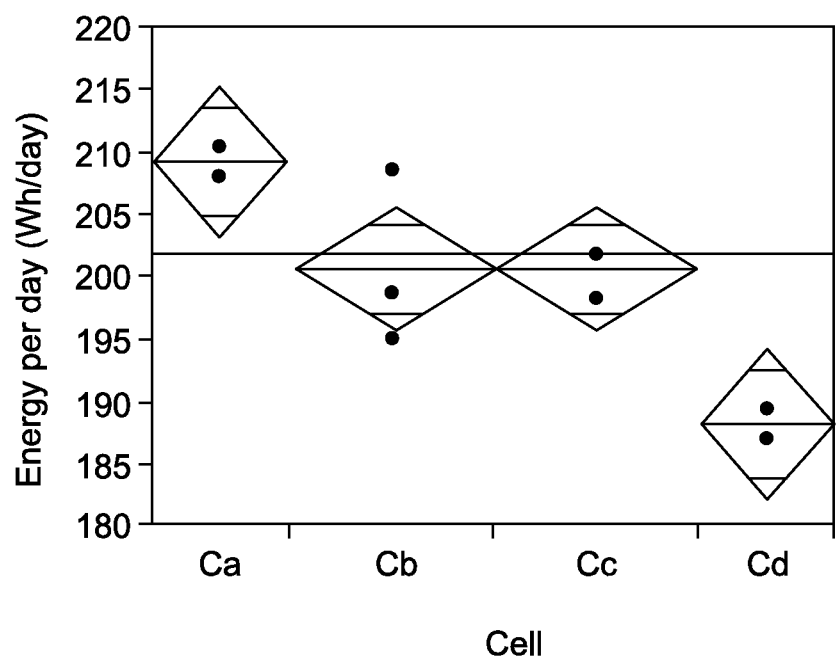
FIG. 4 shows comparative results of energy delivered per day by a comparative energy storage device and experimental energy storage devices, in accordance with some embodiments of the invention.

As shown in FIG. 4, a decrease in the amounts of energy per day, during cycle 12 of the 13 W TOC loop, steps 6 and 7 described above, is observed in the cells Ca, Cb, Cc and Cd with increasing oxygen content (due to $Fe_3O_4$) in the compositions. It had been further observed that if $Fe_3O_4$ was present in high amounts (≥3 weight percent) (i.e. $Fe_3O_4$ is present in high amounts) in the positive electrode composition of a cell, the cell failed due to short circuit during the first cycle. Post test tear down analysis showed the BASE ceramic to be severely cracked.

While several aspects of the present disclosure have been described and depicted herein, alternative aspects may be affected by those skilled in the art to accomplish the same objectives. Accordingly, it is intended by the appended claims to cover all such alternative aspects as fall within the true spirit and scope of the disclosure.

The invention claimed is:

1. A positive electrode composition comprising granules that themselves comprise:
an electroactive metal that comprises nickel;
an alkali metal halide, and
a metal sulfide composition that is substantially free of oxygen, wherein a molar ratio of the nickel to an amount of sulfur in the metal sulfide composition in the granules is in a range of from 2:1 to 10:1,
wherein the positive electrode composition is substantially free of iron oxide, iron sulfate, cobalt oxide, and cobalt sulfate.

2. The positive electrode composition of claim 1, wherein the alkali metal halide comprises at least one halide of sodium, potassium, or lithium.

3. The positive electrode composition of claim 1, wherein the metal sulfide composition is $M_xS_y$, where M is selected from iron or cobalt; and the ratio of x to y is between about 0.5:1 and about 1.5:1.

4. The positive electrode composition of claim 3, wherein the metal sulfide composition $M_xS_y$ is selected from FeS, $FeS_2$, $CoS_2$, or $Co_3S_4$.

5. The positive electrode composition of claim 3, wherein the metal sulfide composition $M_xS_y$ is FeS.

6. The positive electrode composition of claim 1, further comprising an electrolyte salt that comprises a complex metal halide, wherein the electrolyte salt has a melting temperature in a range from about 150 degrees Celsius to about 300 degrees Celsius.

7. The positive electrode composition of claim 6, wherein the electrolyte salt is sodium tetrachloroaluminate ($NaAlCl_4$).

8. The positive electrode composition of claim 1, wherein
the alkali metal halide comprises one or more of sodium chloride, sodium fluoride, sodium iodide, and sodium bromide; and
the metal sulfide composition comprises iron sulfide (FeS).

9. An energy storage device comprising a first compartment comprising an alkali metal, a second compartment comprising a positive electrode composition, and a solid separator capable of transporting alkali metal ions between the first compartment and the second compartment, wherein the positive electrode composition comprises:
(a) an electrolyte salt comprising a complex metal halide; and
(b) granules that themselves comprise:
(i) an electroactive metal that comprises nickel;
(ii) an alkali metal halide; and
(iii) a metal sulfide composition that is substantially free of oxygen, wherein a molar ratio of nickel to an amount of sulfur in the metal sulfide composition in the granules is in a range of from 2:1 to 10:1, and
wherein the positive electrode composition is substantially free of iron oxide, iron sulfate, cobalt oxide, and cobalt sulfate.

10. The energy storage device of claim 9, wherein the alkali metal comprises sodium, potassium or lithium.

11. The energy storage device of claim 9, wherein the first compartment comprises molten sodium.

12. The energy storage device of claim 9, wherein the electrolyte salt is sodium tetrachloro aluminate ($NaAlCl_4$).

13. An energy storage system comprising a plurality of the energy storage devices of claim 9.

14. The positive electrode composition of claim 1, wherein a molar ratio of a total amount of an alkali metal in the alkali metal halide to the amount of sulfur in the metal sulfide composition is between about 1.75:1 and about 10:1.

15. The positive electrode composition of claim 1, wherein the electroactive metal comprises iron, cobalt or combination thereof.

* * * * *